(12) United States Patent
Kitano et al.

(10) Patent No.: US 6,804,593 B2
(45) Date of Patent: Oct. 12, 2004

(54) STEERING SYSTEM FOR MOBILE UNIT

(75) Inventors: Toyoaki Kitano, Tokyo (JP); Masahiro Ieda, Tokyo (JP); Osamu Kono, Tokyo (JP); Yasuhisa Nakamura, Tokyo (JP); Shimon Okada, Tokyo (JP); Kei Kasuga, Tokyo (JP); Shinichi Kato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/270,723

(22) Filed: Oct. 16, 2002

(65) Prior Publication Data

US 2003/0078714 A1 Apr. 24, 2003

(30) Foreign Application Priority Data

Oct. 17, 2001 (JP) .................................... P2001-318921

(51) Int. Cl.⁷ .............................................. B60R 27/00
(52) U.S. Cl. ...................... 701/41; 701/36; 340/995.16; 74/552
(58) Field of Search ........................... 701/41, 200, 211, 701/36; 455/569.1, 569.2, 575.9; 340/815.4, 995.16; 345/156, 168; 74/552, 558, 471 XY, 484 R, 501.6; 180/442

(56) References Cited

U.S. PATENT DOCUMENTS 4,638,131 A * 1/1987 Kidd et al. .............. 200/61.55
5,319,803 A * 6/1994 Allen ......................... 455/566

FOREIGN PATENT DOCUMENTS

JP       Hei 4-279914      10/1992

* cited by examiner

*Primary Examiner*—Tan Q. Nguyen
(74) *Attorney, Agent, or Firm*—Sughrue Mion, PLLC

(57) ABSTRACT

A steering system for mobile unit has a steering section 200 for steering a mobile unit having an operation section 210 on a part thereof, and a control section 240 for enabling the mobile unit to be steered, when the steering section 200 is set at a first installed position, and enabling the operation section 210 to make an operation on the device, when the steering section 200 is set at a second installed position.

7 Claims, 13 Drawing Sheets

STEERING SYSTEM FOR MOBILE UNIT

BACKGROUND OF THE INVENTION

1. Field of the Invention

The present invention relates to a steering system for mobile unit having operation means for operating a device such as a personal computer mounted on a mobile unit such as a car on a part of the steering means.

2. Description of the Related Art

FIG. 14 is a schematic view showing a compartment of the conventional vehicle.

As shown in FIG. 14, reference numeral 1 denotes an instrument panel provided on the front portion within the compartment, 2 denotes an audio device such as a radio receiver, a cassette deck player or a CD player provided on the instrument panel 1, 3 denotes a dash board provided on the upper portion in the center of the instrument panel 1, 4 denotes a steering wheel for steering the car, provided on the right side of the instrument panel 1, and 5 denotes a front seat, in which a driver's seat 5a and an assistant's seat 5b are arranged on the left and right sides.

Conventionally, as a main stream, the audio device 2 was installed in the center of the instrument panel 1, and operated in an operation means arranged around the periphery of the audio device 2. In recent years, an operation means for operating the audio device or an air conditioner is provided on a part of the steering wheel 4, in which the driver operates the operation means provided on the steering wheel, while driving the car.

In this background, a word processor for accommodating the operating means is well known as an electronic device as disclosed in JP-A-4-279914, and constructed as shown in FIG. 15.

FIGS. 15A and 15B, reference numeral 11 denotes a handle, 12 denotes a keyboard case, and 13 denotes a main case. The main case 13 is formed integrally with the handle 11 and the keyboard case 12, and has protuberant bearing portions 14 and 15 for supporting the keyboard case 12 to be rotatable with the handle 11. Also, the handle 11 and the keyboard case 12 are integrally formed, and attached to the main case 13 to be rotatable in a direction of the arrow.

FIG. 15A is a view showing an accommodated state of the keyboard case 12, and FIG. 15B is a view showing a service state of the keyboard case 12.

In these figures, when the keyboard case 12 is accommodated, the handle 11 formed integrally with the keyboard case 12 projects from the front face. When the keyboard case 12 is used, the keyboard case 12 is rotated so that the handle 11 is accommodated on a bottom face 11a of the main case 13.

In the conventional construction as above described, to employ the electronic device on a car as a mobile unit, an operation means had to be taken into the mobile unit, whereby it was required to connect the electronic device to display means provided within the car and a power source mounted on the car, or provide a space for disposing the operation means within the car, every time the operation means was employed, resulting in a problem that the user was very inconvenient.

In the conventional mobile unit, the operation means was provided on a part of the steering means for steering the mobile unit, but since there was only a space for providing the operation means on a part around the periphery of the steering means, it was required to select operations of the operation means, resulting in a problem that the operation had a lower degree of freedom.

Conventionally, some mobile units had the operation means for operating the audio device or air conditioner on a part of the steering wheel. However, since the driver could perform the operation without regard to the running condition of the mobile unit, there was a problem that the driver was distracted while driving.

SUMMARY OF THE INVENTION

This invention has been achieved to solve the above-mentioned problems, and it is an object of the invention to provide a steering system for mobile unit comprising a steering section for steering a mobile unit by a rotation operation in a first rotation direction, the steering section having operation section for operating a device provided on the mobile unit in one part, and provided to be rotatable respectively in a first and a second rotation directions, and a control section for enabling the mobile unit to be steered when the steering section is rotated in one direction of the second rotation direction and set at a first installed position, and enabling the operation section to operate the device when the steering section is rotated in the other rotation direction and set at a second installed position, whereby the user can use the device without making the settings every time of using the device provided on the mobile unit, and is more expedient.

Also, it is another object of the invention to provide the steering system for mobile unit comprising an installed position detecting section for detecting whether the steering system is set at the first installed position or the second installed position, wherein the control section enables the mobile unit to be steered or the operation section to operate the device, on the basis of a detection of the installed position detecting section, whereby the user can make the operation of the device correctly and the reliability of the device is enhanced.

It is another object of the invention to provide the steering system for mobile unit, wherein the operation section is formed integrally with the steering section, and disposed on the back face of the steering section when the steering section is set at the first installed position, or disposed on the front surface of the steering section when the steering section is set at the second installed position, whereby there is no need for a new space for installing the operation section within the mobile unit, and the degree of freedom for designing is increased.

It is another object of the invention to provide the steering system for mobile unit, further comprising a display section placed near a driver's seat of the mobile unit, and a display control section for displaying the mobile information output from the mobile unit on the display section when the steering section is set at the first installed position, or displaying the output information of the device operated by the operation section provided on the steering section on the display section when the steering section is set at the second installed position, whereby the display unit can be shared without regard to the display contents, and the number of parts and the cost can be reduced.

It is another object of the invention to provide the steering system for mobile unit, wherein the mobile information displayed on the display section when the steering section is set at the first installed position is the operative condition information indicating an operative condition of the mobile unit or the running guide information indicating a running guide of the mobile unit, whereby various pieces of information can be displayed on the shared display unit, and the user is more expedient.

It is another object of the invention to provide the steering system for mobile unit, comprising a running condition judging section for judging a running condition of the mobile unit, wherein an operation of the operation section is invalidated on the basis of a judgment of the running condition judging section, whereby it is judged whether the operation is valid or not depending on the running condition of the mobile unit, and the reliability of the device is enhanced.

Further, it is another object of the invention to provide the steering system for mobile unit, further comprising a running condition judging section for judging a running condition of the mobile unit, a braking condition detecting section for detecting a braking condition of the mobile unit, and a steering position moving section for moving the installed position of the steering section to the first installed position, if the braking condition detecting section detects the braking condition, when the installed position detecting section detects that the steering section is set at the second installed position, whereby when the user steers the mobile unit, the user can save the trouble of changing the installed position of steering section, and is more expedient.

A steering system for mobile unit according to the present comprises a steering section for steering a mobile unit by a rotation operation in a first rotation direction, the steering section having operation section for operating a device provided on the mobile unit in one part, and provided to be rotatable respectively a first and a second rotation directions, and control section for enabling the mobile unit to be steered when the steering section is rotated in one direction or the second rotation direction and set at a first installed position, and enabling the operation section to operate the device when the steering section is rotated in the other rotation direction and set at a second installed position.

Further, the steering system for mobile unit according to the invention further comprises an installed position detecting section for detecting whether the steering system is set at the first installed position or the second installed position, wherein the control section enables the mobile unit to be steered or the operation section to operate the device, on the basis of a detection of the installed position detecting section.

Still further, the steering system for mobile unit according to the invention is characterized in that the operation section is formed integrally with the steering section, and disposed on the back face of the steering section when the steering section is set at the first installed position, or disposed on the front surface of the steering section when the steering section is set at the second installed position.

Still further, the steering system for mobile unit according to the invention further comprises display section placed near a driver's seat of the mobile unit, and display control section for displaying the mobile information output from the mobile unit on the display section when the steering section is set at the first installed position, or displaying the output information of the device operated by the operation section provided on the steering section on the display section when the steering section is set at the second installed position.

Still further, the steering system for mobile unit according to the invention is characterized in that the mobile information displayed on the display section when the steering section is set at the first installed position is the operative condition information indicating an operative condition of the mobile unit or the running guide information indicating a running guide of the mobile unit.

Still further, the steering system for mobile unit according to the invention further comprises a running condition judging section for judging a running condition of the mobile unit, and an operation of the operation section is invalidated on the basis of a judgement of the running condition judging section.

Moreover, the steering system for mobile unit according to the invention further comprises a running condition judging section for judging a running condition of the mobile unit, a braking condition detecting section for detecting a braking condition of the mobile unit, and steering position moving section for moving the installed position of the steering section to the first installed position, if the braking condition detecting section detects the braking condition, when the installed position detecting section detects that the steering section is set at the second installed position.

DETAILED DESCRIPTION OF THE PREFERRED EMBODIMENTS (Embodiment 1)

Figure 1:
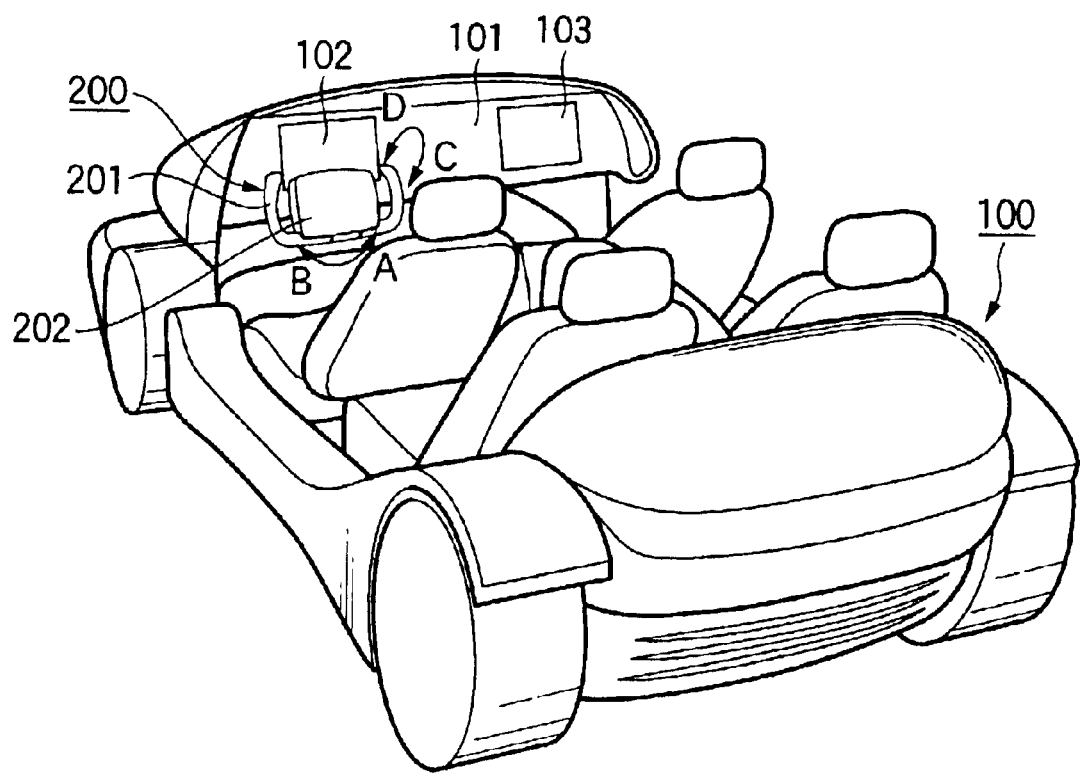
FIG. 1 is an overall schematic view of a steering system for mobile unit according to an embodiment 1 of the present invention.
Figure 2:
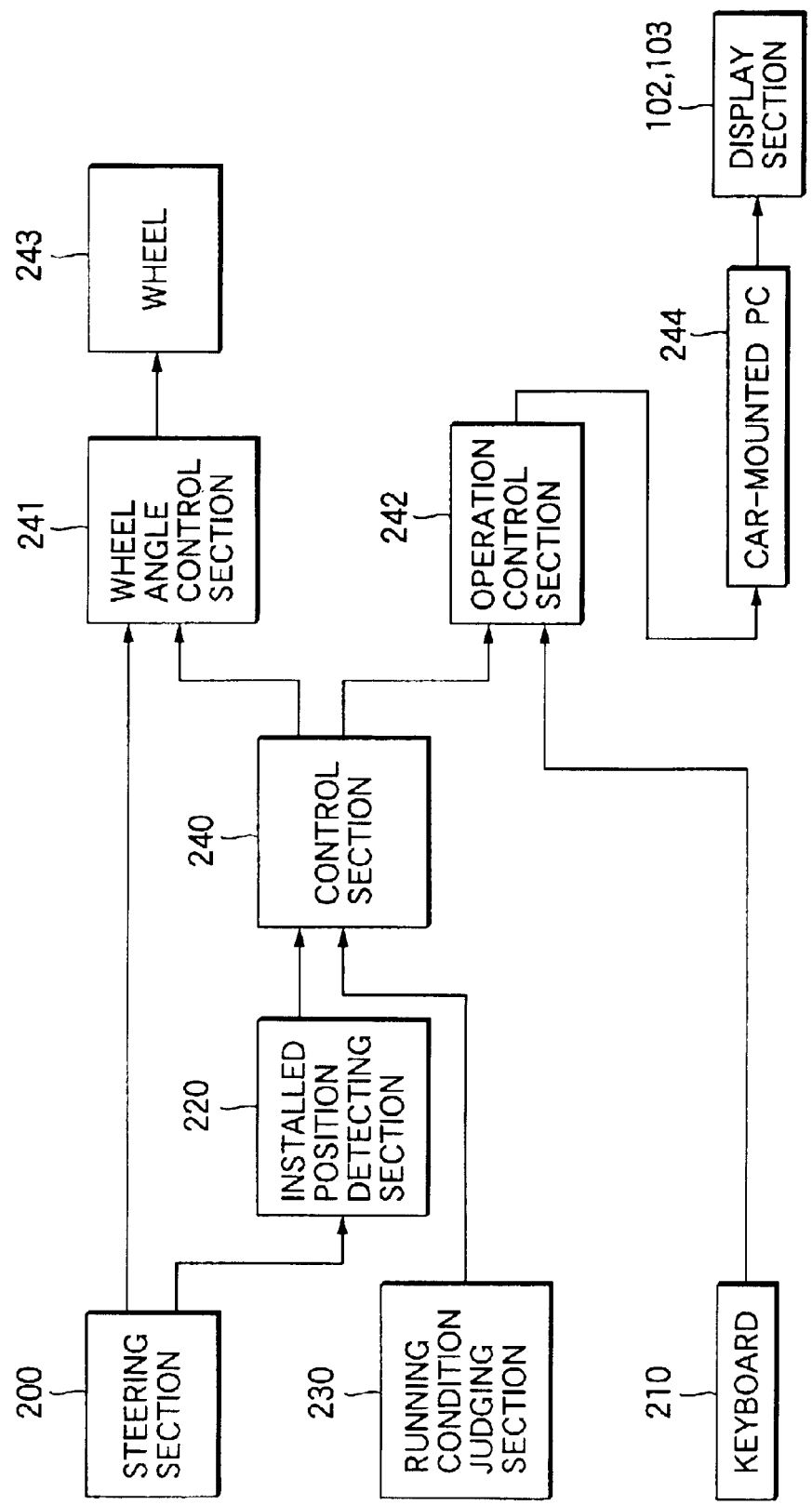
FIG. 2 is a block diagram showing the essential configuration of the steering system for mobile unit as shown in FIG. 1.
Figure 3:
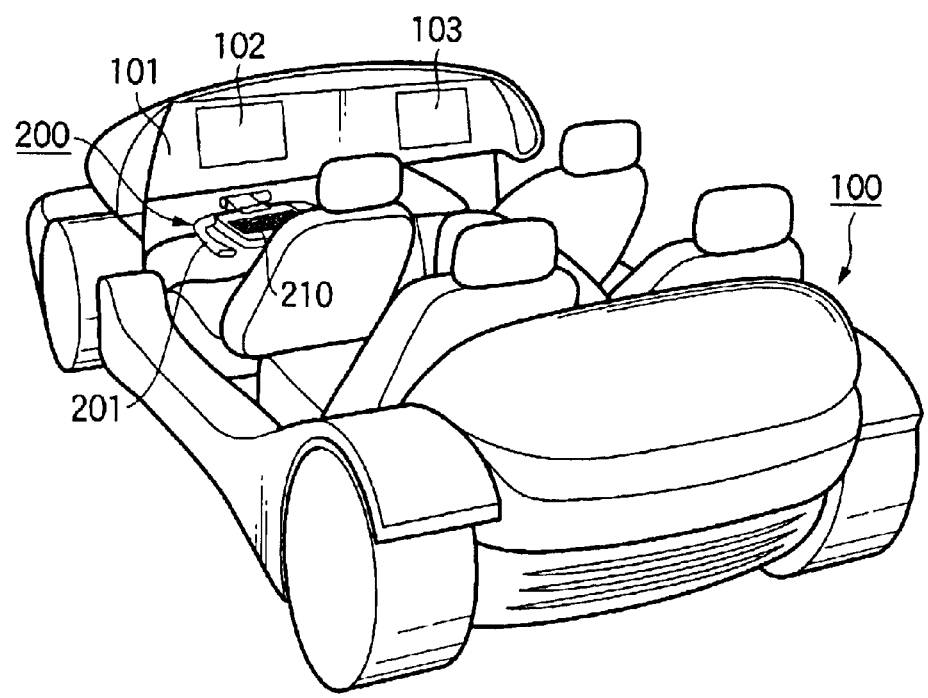
FIG. 3 is an explanatory view showing a moving condition of the steering system for mobile unit as shown in FIG. 1.

FIG. 1 is an overall schematic view of a steering system for mobile unit according to an embodiment 1 of the present invention. FIG. 2 is a block diagram showing the essential configuration of the steering system for mobile unit as shown in FIG. 1. FIG. 3 is a motion condition view showing a moving condition of the steering system for mobile unit as shown in FIG. 1.

Also, FIGS. 4 to 8 are a schematic view showing the essential configuration of the steering system for mobile unit as shown in FIG. 1. FIGS. 7A and 8A show the driver's side (front face side), and FIGS. 7B and 8B show the back face side.

Figure 9:
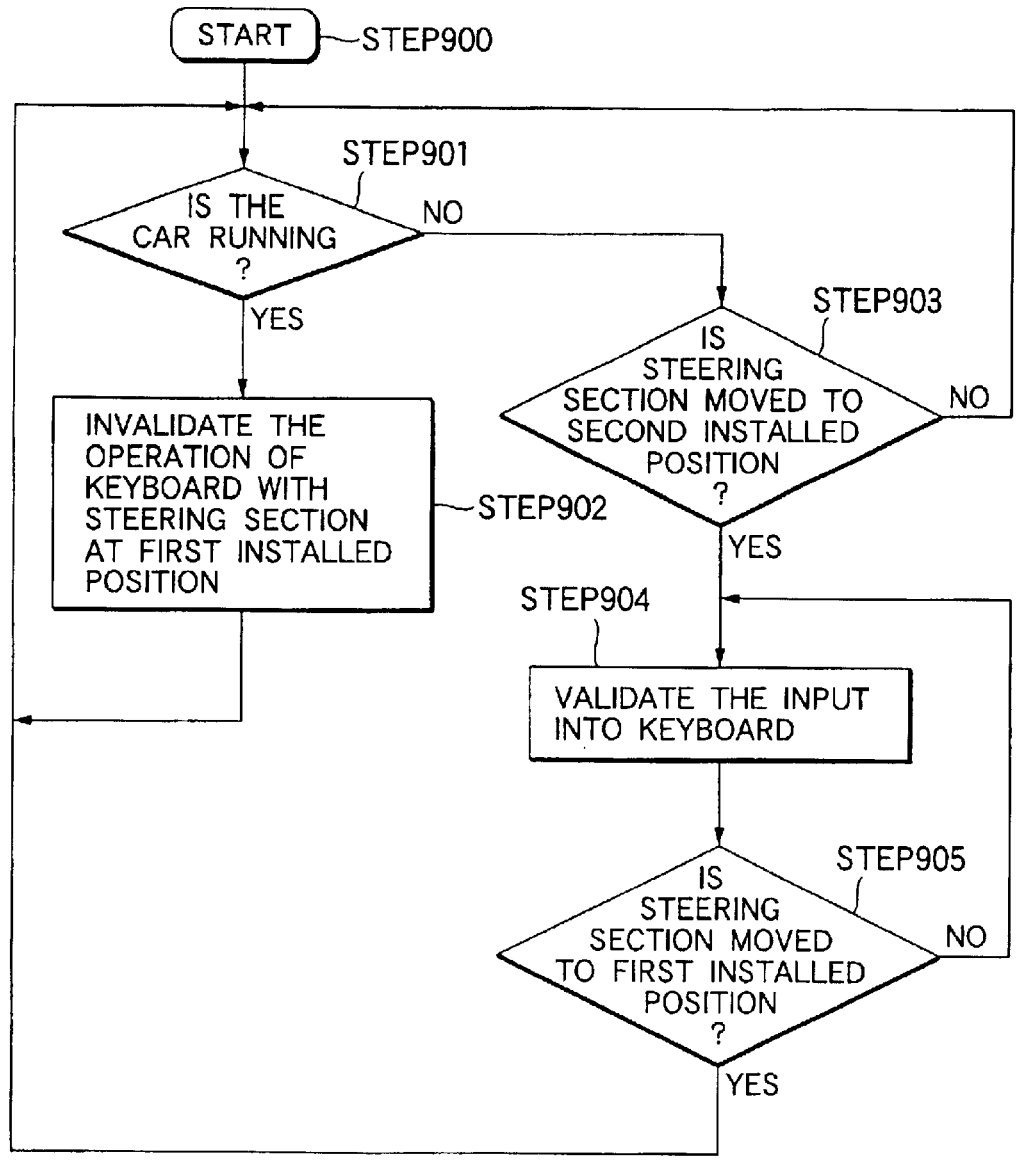
FIG. 9 is a flowchart showing the operation of the steering system for mobile unit as shown in FIG. 1.

FIG. 9 is a flowchart showing the operation of the steering system for mobile unit as shown in FIG. 1.

In FIGS. 1 to 9, reference numeral 100 denotes a car as a mobile unit, 101 denotes an instrument panel made of resin and provided in front of a compartment of the car, 102 denotes a first display unit of the instrument panel 101 provided on the driver's side (as will be described later), 103 denotes a second display unit of the instrument panel 101 provided on the passenger side, in which the first display unit 102 and the second display unit 103 display the information indicating the operative condition of the car, including the speed information, engine speed information, fuel remaining information, water temperature gauge information, battery voltage, map information as navigation information, and audio operation information.

Reference numeral 200 denotes steering section for steering a mobile unit provided rotatably in A direction or B direction that is a different first rotation direction, and C direction or D direction that is a second rotation direction, in which the car is steered by changing the angle of wheels by making a rotation operation in the first rotation direction, namely, in the left direction by making rotation operation in A direction, or right direction by making rotation operation in B direction. This steering section 200 comprises a grip portion 201 which the driver grips for maneuvering, and a warning sound generating portion 202 for generating a warning sound by pressing it.

On the back face of the warning sound generating portion 202, a keyboard 210 is provided as operation section for operating a car-mounted personal computer and an air conditioner (both not shown). The warning sound generating portion 202 contains an air bag device (not shown), and when an accident happens, this air bag device is operable.

Herein, the keyboard 210 will be described below. The warning sound generating portion 202 is opposed to the driver, who is driving the car (normal condition), that is, the keyboard 210 is invisible to the driver and is inoperable (first installed position), as shown in FIG. 1. This is because the keyboard 210 is disabled to operate, while the car is moving, in which the grip portion 201 and the warning sound generating portion 202, which are integrated, can not be shifted in the C direction.

Figure 4:
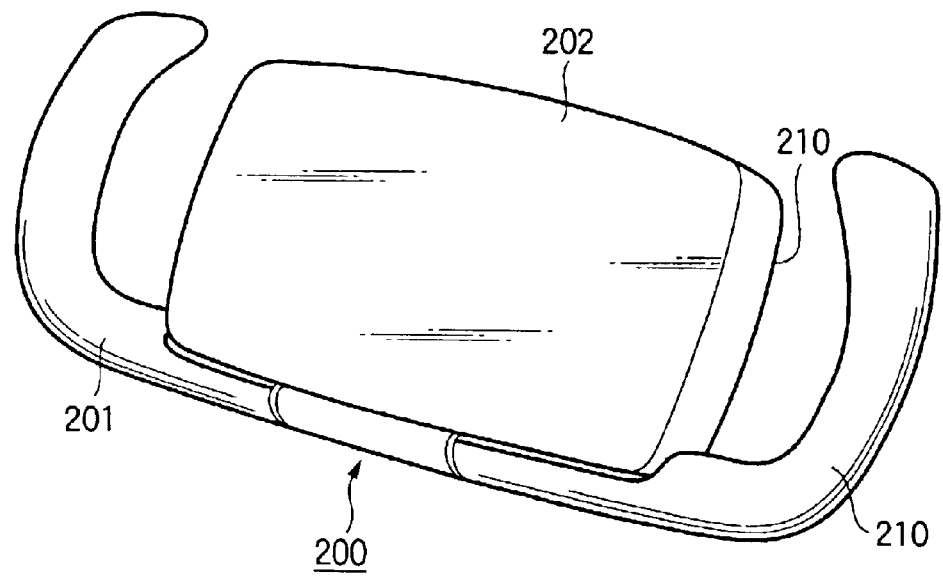
FIG. 4 is a schematic view showing the essential configuration of the steering system for mobile unit as shown in FIG. 1.
Figure 5:
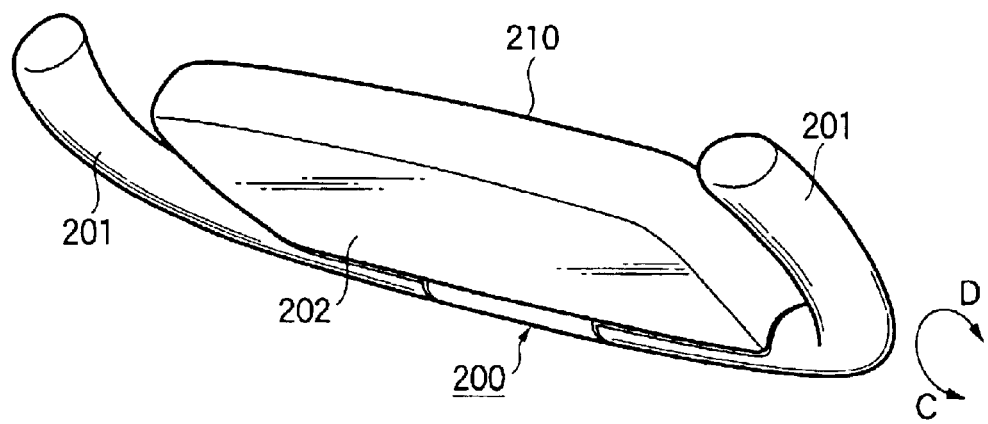
FIG. 5 is an explanatory view showing the moving condition of the essence of the steering system for mobile unit as shown in FIG. 4.
Figure 6:
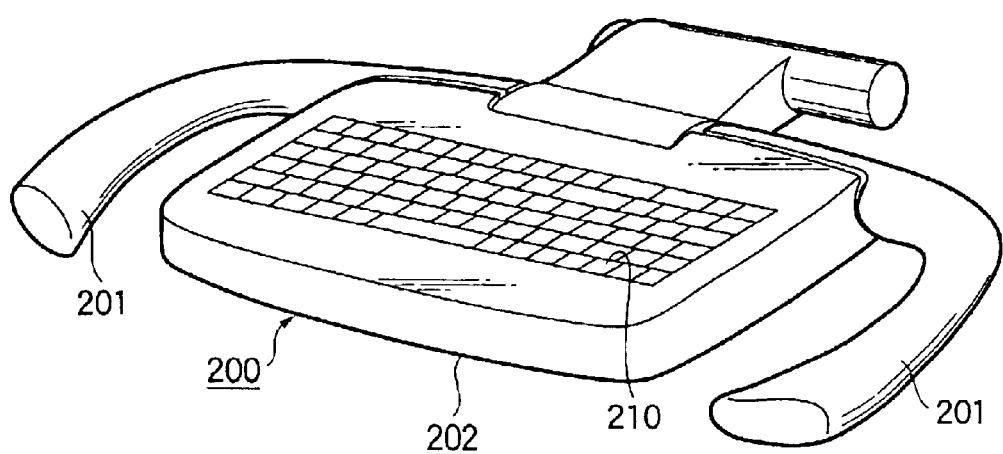
FIG. 6 is an explanatory view showing the moving condition of the essence of the steering system for mobile unit as shown in FIG. 4.

Herein, FIG. 4 is a view showing a state where the steering section is set at the first installed position, FIG. 5 is a view showing a state where the steering section is moved, namely, between the first installed position and the second installed position, and FIG. 6 is a view showing a state where the steering section is set at the second installed position.

Figure 7A:
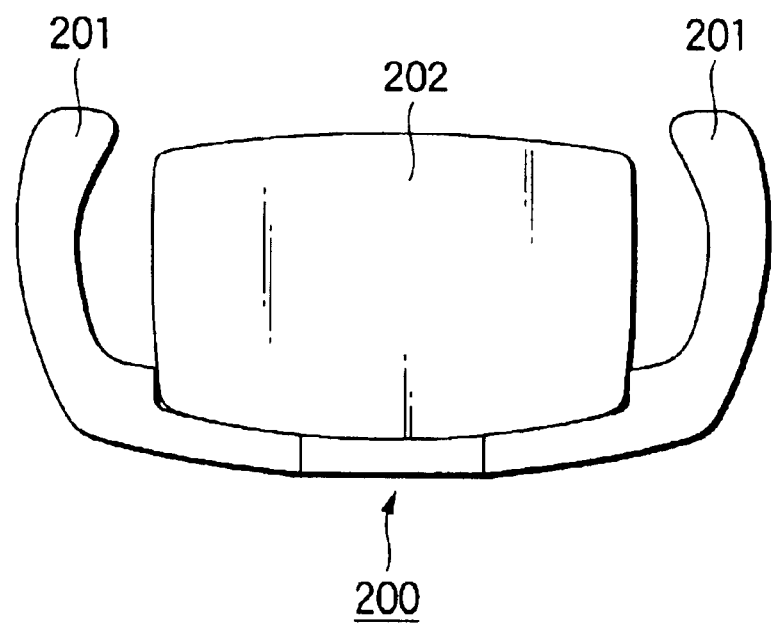
FIGS. 7A and 7B are schematic views showing the constitution of the essence of the steering system for mobile unit as shown in FIG. 1.
Figure 7B:
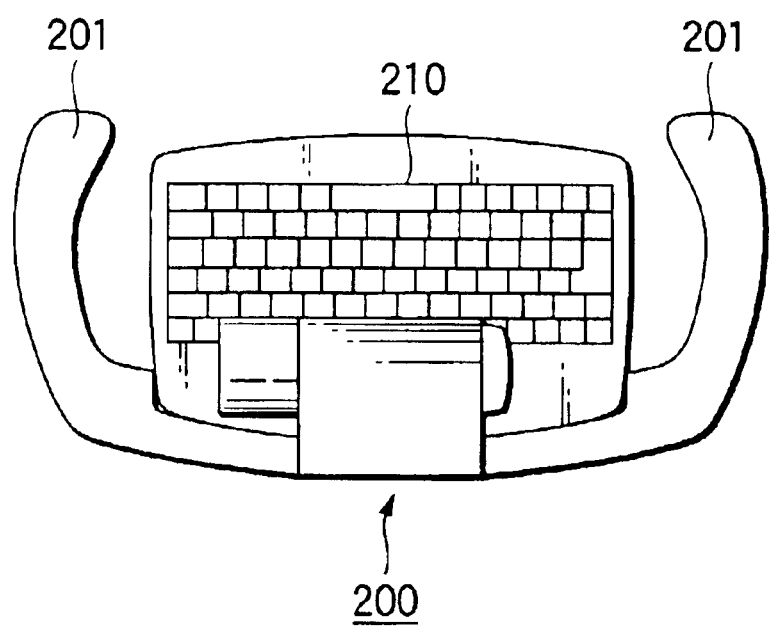
Figure 8A:
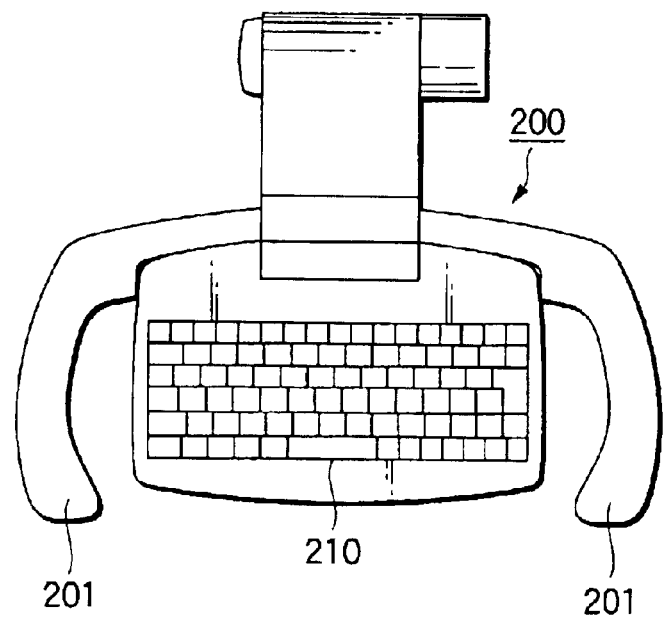
FIGS. 8A and 8B are explanatory views showing the moving condition of the essence of the steering system for mobile unit as shown in FIG. 7.
Figure 8B:
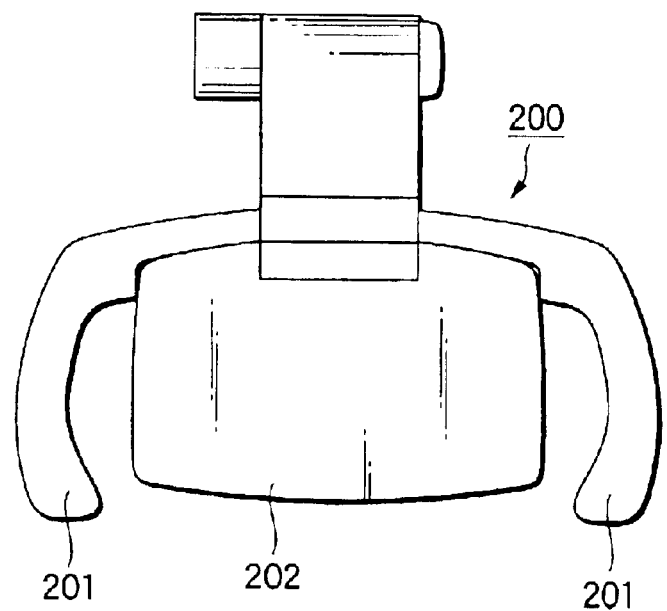

Also, FIGS. 7A and 7B are views showing a state where the steering section is set at the first installed position, FIGS. 8A and 8B are views showing a state where the steering section is set at the second installed position.

If the car is parked, the inhibit movement of the grip portion 201 and the warning sound generating portion 202 in the C direction is released, so that they can be moved in the C direction. For example, in a case where the car-mounted personal computer is operated, the grip portion 201 and the warning sound generating portion 202 are moved in the C direction from the set state at the first installed position as shown in FIG. 1 and can be moved to the set state at the second installed position as shown in FIG. 3. The steering section, while moving them, is placed in a state as shown in FIG. 5.

When the grip portion 201 and the warning sound generating portion 202 are moved to the state as shown in FIG. 3 (second installed position), the steering operation of the car is placed in an inhibit state, thereby disabling the car to be maneuvered. On the other hand, the inhibit state of making operation on the operation section 210 is released, enabling operation. The state where the steering section is set at the second installed position is shown in FIGS. 6 and 8.

After making operation on the operation section 210, the grip portion 201 and the warning sound generating portion 202 are moved in the D direction, and placed in the set state at the first installed position as shown in FIG. 1, enabling maneuvering. At this time, the operation on the operation section 210 is inhibited.

220 denotes installed position detecting section for detecting whether the steering section 200 including the grip portion 201 and the warning sound generating portion 202 is set at the first installed position or the second installed position. This installed position detecting section 220 judges the set position of the steering section 200 in such a way that a light receiving portion and a light emitting portion are provided around a rotation shaft (not shown) of the steering section 200 including the grip portion 201 and the warning sound generating portion 202 for each of the first installed position and the second installed position, and the steering section 200, when rotated, intercepts a light path constituted of the light receiving portion and the light emitting portion provided at the first or second installed position, thereby judging the steering section 200 to be set at the installed position where light path is intercepted.

230 denotes running condition judging section for judging a running condition of the car 100, or judging whether or not the car is moving on the basis of a car speed pulse or whether the parking brake is on or off.

240 denotes control section for enabling the mobile unit to be steered, when the steering section 200 is rotated in D direction that is one direction or the second rotation direction, and set at the first installed position, or enabling the operation section such as keyboard 210 to operate the device such as a car-mounted PC 244, when the steering section 200 is rotated in C direction that is the other direction, and set at the second installed position. This control section 240 outputs a steering signal from the steering section 200 to wheel angle control section 241 to steer the car 100, when the steering section is at the first installed position as shown in FIGS. 1 and 4 and the car is running, on the basis of the detected result of the installed position detecting section 220 and the judged result of the running condition judging section 230, and controls the operation control section 244 to invalidate an operation signal that is issued from the keyboard.

The control section 240 enables the keyboard 210 to be operated, when the steering section 200 is at the second installed position as shown in FIGS. 3 and 6, in which the car is not steered or parked.

241 denotes wheel angle control section for controlling the angle of a wheel 243 on the basis of a steering amount and a rotation direction from the steering section 200 and a control signal from the control section 240. 242 denotes operation control section for controlling the operation of the car-mounted PC 244 as a personal computer mounted on the car, on the basis of an operation signal from the keyboard 210 and a control signal from the control section 240. Display units 102 and 103 display the information output by the car-mounted PC 244 on the basis of an output from this operation control section 242.

Referring to FIG. 9, the operation will be described below.

FIG. 9 is a flowchart showing the operation of the steering system for mobile unit according to the embodiment 1. If ignition is turned on, the steering section 200 can be operated (step 900).

After this step 900, the running condition judging section 230 judges a running condition of the car (step 901). If it is judged that the car is in the running condition, the steering section including the grip section 201 and the warning sound generating portion 202 is set at the first installed position. Thereby, the steering section is set to accept no operation from the keyboard 210, or the keyboard 210 is set to be inoperable. Then, the procedure returns to step 901 to repeat the process.

On the other hand, if it is judged that the car is not in the running condition or is parked at step 901, the installed position detecting section 220 detects whether or not the steering section 200 including the grip portion 201 and the warning sound operating portion 202 is set at the second installed position. If it is detected that the steering section 200 is at the second installed position (step 903), the keyboard becomes effective for input and operable (step 904).

After this step 904, the installed position detecting section 220 detects the installed position of the steering section 200 again. If it is judged that the steering section is set at the first installed position (step 905), the procedure returns to step 901 to repeat the above process.

If it is judged at step 903 that the steering section 200 is set at the first installed position, the procedure returns to step 901 to repeat the above process. If it is judged at step 905 that the steering section 200 is set at the second installed position, the procedure returns to step 904 to repeat the above process.

Accordingly, with the above configuration, the operation section provided for the steering section is enabled in a situation where the steering section is not in use, whereby the user is more expedient, there is no need for a space for the operation section within the car, and the degree of freedom within the compartment is increased.

(Embodiment 2)

In the above Embodiment 1, the car-mounted PC as an object device for operating with the keyboard 210 is exemplified, and the information output from this car-mounted PC is displayed on the display unit. However, this car-mounted PC may be configured as shown in FIG. 10.

When the steering section 200 is set at the first installed position, it is judged that the car is in a running condition, whereby the vehicle information, including the car speed, engine rotating speed, the fuel remaining amount, battery voltage, and tire air pressure is displayed on the display unit. On one hand, when the steering section 200 is set at the second installed position, it is judged that the car is parked and in a condition where the keyboard 210 is operable, whereby the information output from the car-mounted PC 244, audio device 245 or navigation device 246 as the car-mounted device is displayed on the display unit.

Figure 10:
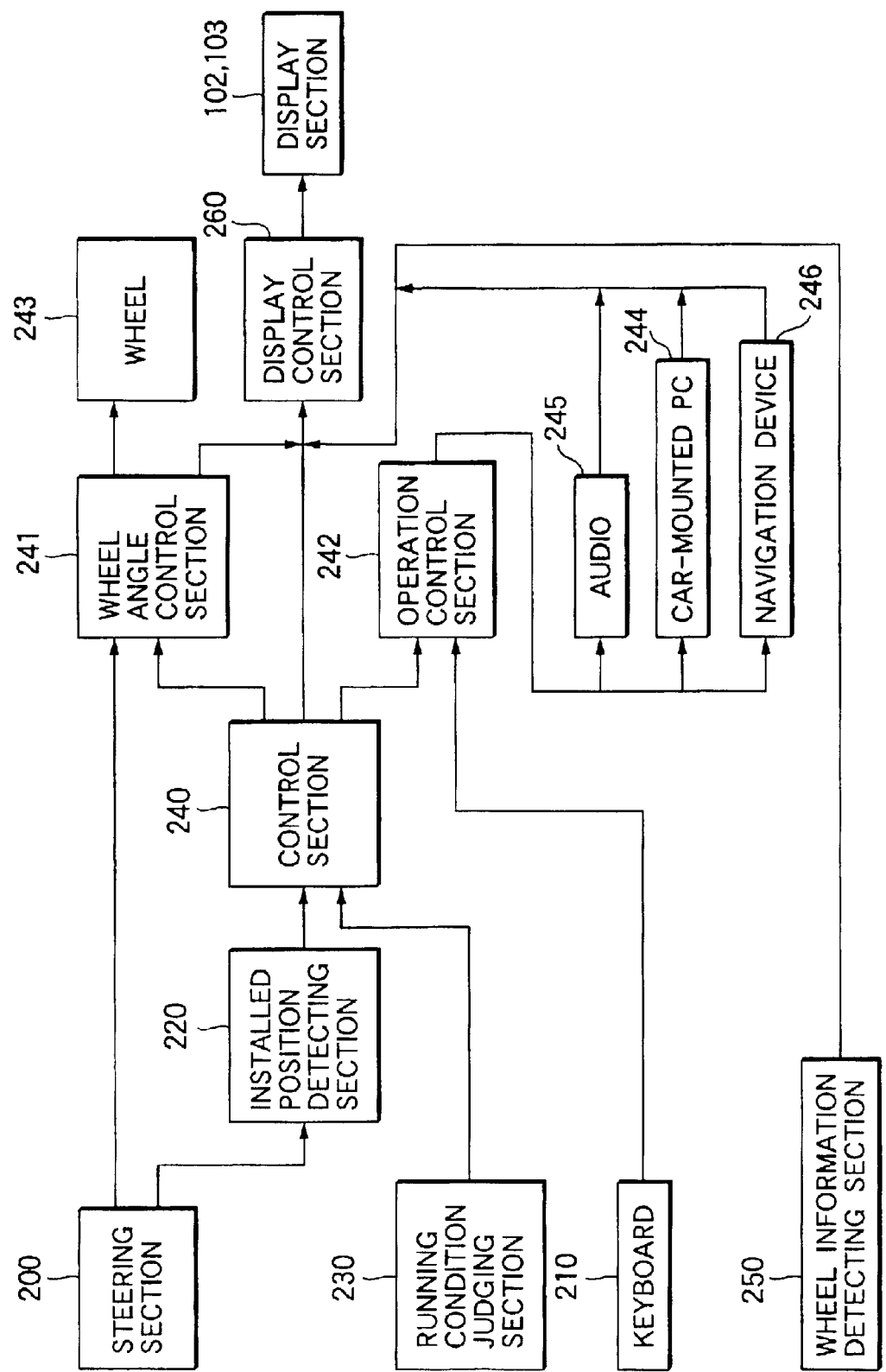
FIG. 10 is an overall block diagram of a steering system for mobile unit according to an embodiment 2 of the invention.
Figure 11:
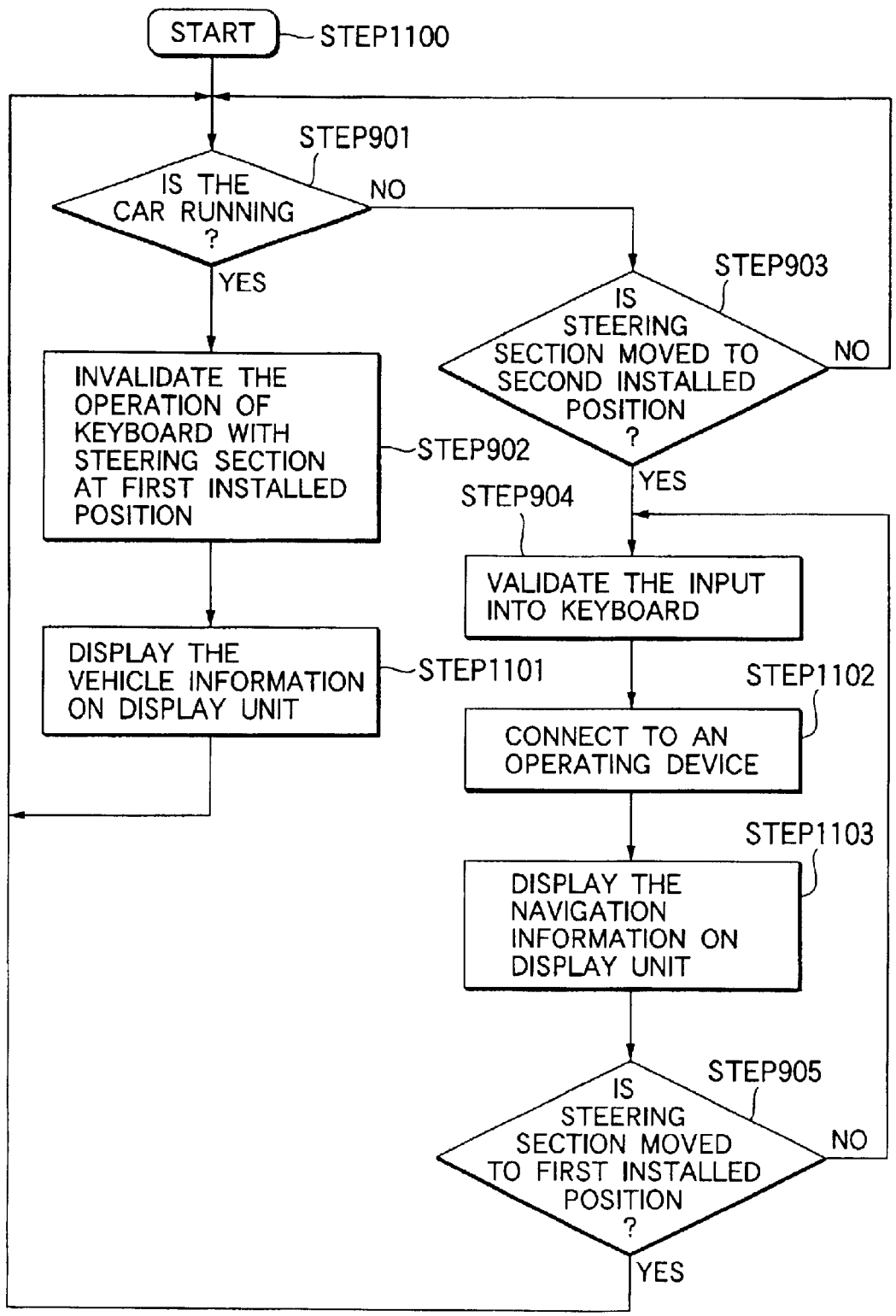
FIG. 11 is a flowchart showing the operation of the steering system for mobile unit as shown in FIG. 9.

FIG. 10 is a block diagram showing the configuration of the embodiment 2, and FIG. 11 is a flowchart showing the operation of FIG. 10. Referring to FIGS. 10 and 11, this embodiment 2 will be described below.

The same or like parts are designated by the same numerals as in FIG. 2, and those parts are not described here.

245 denotes an audio device controllable via operation control section 242 upon an operation from the keyboard 210. This audio device 245 consists of CD deck, MD deck, DVD deck, cassette tape, radio device or television device.

246 denotes a navigation device controllable via the operation control section 242 upon an operation from the keyboard 210. This navigation device 246 has a function of map display, route guide, and facility retrieval.

250 denotes vehicle information detecting section for detecting the vehicle information. The vehicle information detected by the vehicle information detecting section 250 is output to the display control section 260 to display the vehicle information on the display units 102 and 103.

260 denotes display control section to control the display units 102 and 103 to display the contents on the basis of the outputs from the control section 240, vehicle angle control section 241, audio device 245, car-mounted PC 244, navigation device 246 and vehicle information detecting section 250.

Referring to FIG. 11, the operation will be described below.

If ignition is firstly turned on, the steering section 200 can be operated and the process is started (step 1100).

After this step 1100, the running condition judging section 230 judges a running condition of the car (step 901). If it is judged that the car is in the running condition, the steering section including the grip section 201 and the warning sound generating portion 202 is set at the first installed position. Thereby, the steering section is set to accept no operation from the keyboard 210, or the keyboard 210 is set to be inoperable (step 902). The vehicle information detected by the vehicle information detecting section 250 is displayed on the display units 102 and 103 under the control of the display control section 260 (step 1101). After this step 1101, the procedure returns to step 901 to repeat the process.

On the other hand, if it is judged that the car is not in the running condition or is parked at step 901, the installed position detecting section 220 detects whether or not the steering section 200 including the grip portion 201 and the warning sound operating portion 202 is set at the second installed position. If it is detected that the steering section 200 is at the second installed position (step 903), the keyboard becomes effective for input and operable (step 904).

After this step 904, the keyboard 210 is connected to an object device to be operated, for example, a navigation device 246 (step 1102). Then, the navigation information output from the navigation device 246 is displayed on the display units 102 and 103 (step 1103).

After the step 1103, the installed position detecting section 220 detects the installed position of the steering section 200 again. If it is judged that the steering section is set at the first installed position (step 905), the procedure returns to step 901 to repeat the above process.

Also, if it is judged at step 903 that the steering section 200 is set at the first installed position, the procedure returns to step 901 to repeat the above process. If it is judged at step 905 that the steering section 200 is set at the second installed position, the procedure returns to step 904 to repeat the above process.

Accordingly, with the above configuration, the display unit for displaying the vehicle information and the display unit for displaying the car-mounted device information can be shared, whereby there is no need for providing separate display units, and the installation space can be saved, resulting in lower cost.

(Embodiment 3)

Figure 12:
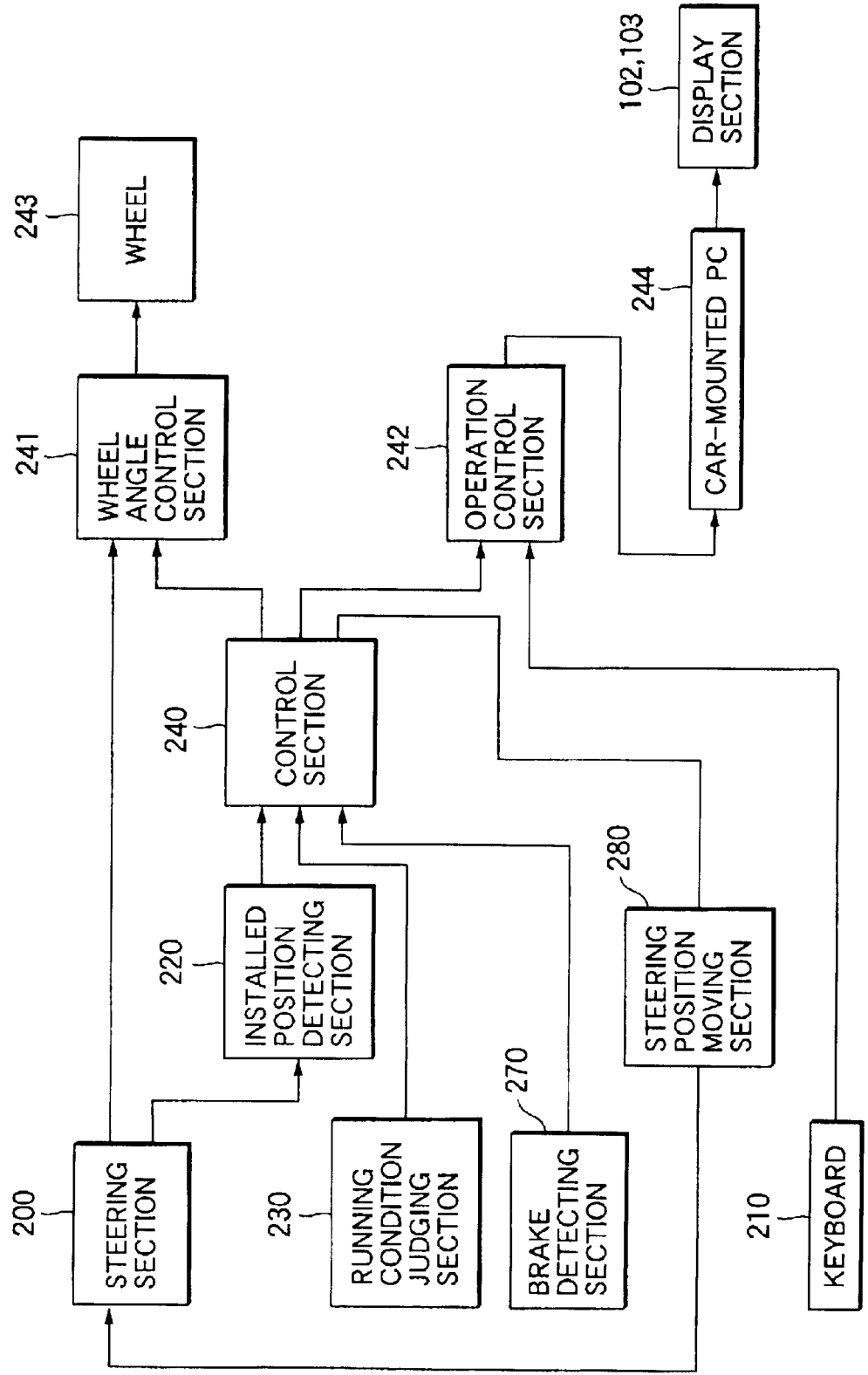
FIG. 12 is an overall block diagram of a steering system for mobile unit according to an embodiment 3 of the invention.

In the above Embodiments 1 and 2, when it is judged that the installed position of the steering section is set at the second installed position, it is required for the user (driver) to set the steering section at the first installed position to run the car. However, the mobile steering section may be configured as shown in FIG. 12. That is, when the car in parking condition is run, the driver needs to change a transmission system into drive or neutral, while putting one's foot on a braking pedal.

Thus, by putting one's foot on the brake pedal as a trigger, if the installed position of the steering section 200 is at the second installed position, the steering section is automatically moved to the first installed position, thereby to be more expedient for the user.

Figure 13:
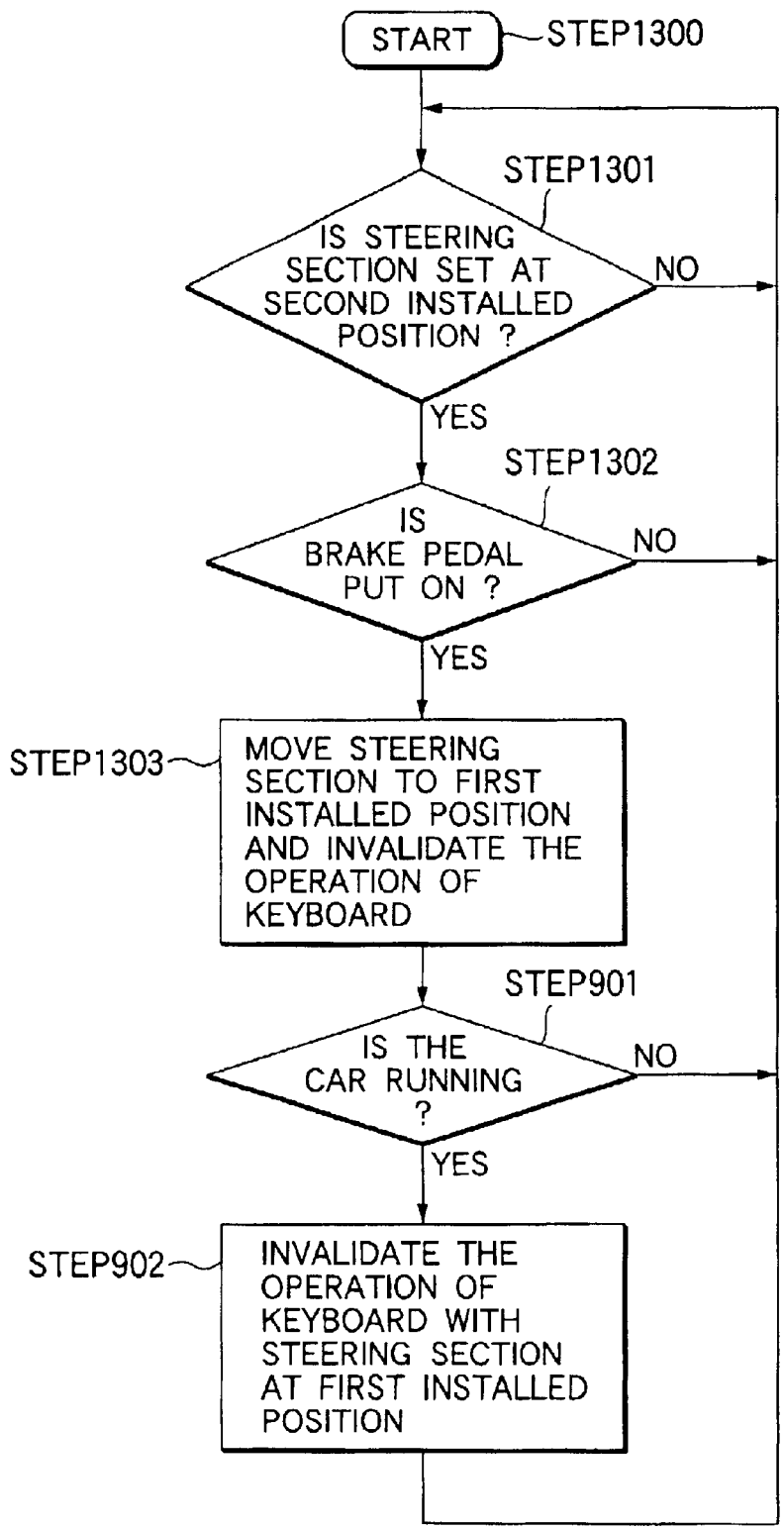
FIG. 13 is a flowchart showing the operation of the steering system for mobile unit as shown in FIG. 12.
Figure 14:
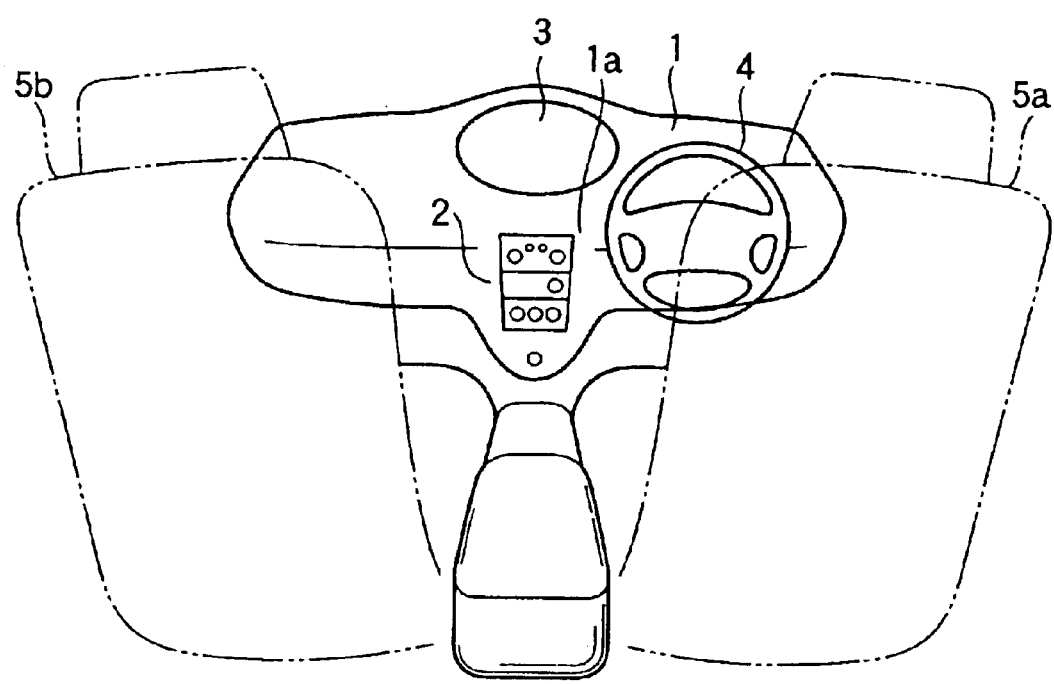
FIG. 14 is an overall schematic view showing the conventional steering system for mobile unit.
Figure 15A:
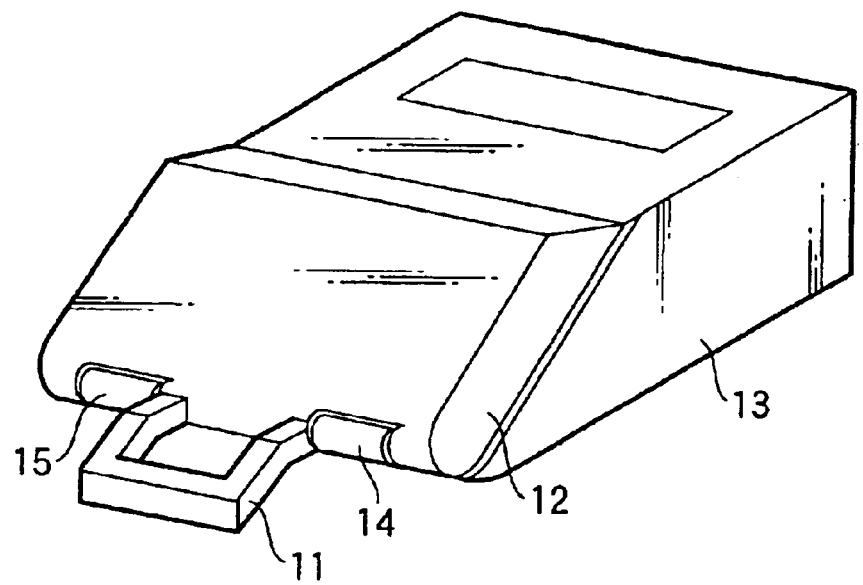
FIGS. 15A and 15B are schematic views showing the essential constitution of the conventional electronic equipment.
Figure 15B:
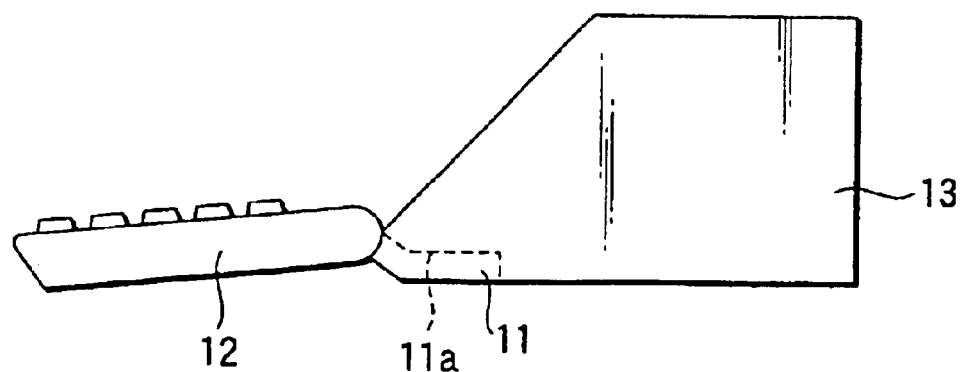

FIG. 12 is a block diagram showing the configuration of a steering system for mobile unit according to an embodiment 3 of the invention, and FIG. 13 is a flowchart showing the operation of FIG. 12. Referring to FIGS. 12 and 13, the embodiment 3 will be described below.

The same or like parts are designated by the same numerals as in FIGS. 2 and 10, and not described here.

270 denotes brake detecting section for detecting the driver putting on the brake pedal, and 280 denotes steering position moving section for moving the installed position of the steering section 200 to the first installed position, on the basis of a control instruction signal output from the control section 240.

This steering position moving section 280 moves the steering section 200 from the second installed position to the first installed position by operating a rotation system (not shown) formed in the steering section 200.

If ignition is firstly turned on, the steering section 200 can be operated and the process is started (step 1300).

After this step 1300, the installed position detecting section 220 detects whether or not the steering section 200 including the grip section 201 and the warning sound generating portion 202 is set at the second installed position. If it is detected that the steering section 200 is set at the second installed position (step 1301), brake detecting section 270 detects whether or not the brake pedal (not shown) is put on (step 1302). After the step 1302, the installed position detecting section 220 detects whether or not the steering section 200 including the grip section 201 and the warning sound generating portion 202 is set at the first installed position. If it is detected that the steering section 200 is set at the first installed position (step 1303), the input into the keyboard 210 is inhibited.

After the step 1303, the running condition detecting section 230 judges whether or not the car is in the running condition (step 901). If it is judged that the car is running, the steering section 200 is set at the first installed position. Thereby, the steering section is set to accept no operation from the keyboard 210, or the keyboard is set to be inoperable (step 902). The procedure returns to step 1301 to repeat the above process.

If it is judged that the steering section 200 is not set at the second installed position at step 1301, the brake pedal is not put on at step 1302, or the car is parked at step 901, the procedure returns to step 1301 to repeat the above process.

Accordingly, with the above constitution, if it is judged that the brake pedal is put on when the steering section is set at the second installed position, supposing that the car is run, the steering section is automatically moved to the first installed position to make the car ready to run, whereby the device is more expedient, and when the user starts to run the car in parking condition with the steering section set at the second installed position, the user has no trouble of setting the steering section to the first installed position.

(Embodiment 4)

In the above Embodiment 2, the vehicle information and the car-mounted device information are displayed as the display contents on the display unit. However, the vehicle information may be displayed while the car-mounted device information is displayed, whereby there is obtained the same effect.

(Embodiment 5)

In the above Embodiment 3, the brake detecting section judges whether or not the brake pedal is put on. However, any mechanism relating to a braking system of the car may be employed, for example, a parking brake that is turned on or off.

(Embodiment 6)

In the above Embodiments 1 to 5, the keyboard as operation section is integrally provided on the steering section. However, the keyboard 210 may be separated from the warning sound generating portion 202 in the steering section. That is, when the mobile unit is in the running condition, or when the keyboard is not used, the keyboard may be folded back on the back face of the warning sound generating portion facing the driver, and when the keyboard is used, the keyboard may be pulled out of the back face of the warning sound generating portion to face the driver, whereby there is the same effect.

(Embodiment 7)

In the above Embodiments 1 to 6, an acoustic and video device installed within-the car is operated by the keyboard 210. However, it is unnecessary that the car-mounted device is always installed within the car, but the keyboard may be provided with a radio transmitting and receiving feature to communicate with a portable unit brought into the car by radio, and display the contents on the display unit, whereby the steering system for mobile unit can have an extended service range.

(Embodiment 8)

In the above Embodiments 1 to 7, the running condition judging section 230 for judging the running condition of the car is provided. However, when the driver sets the steering section, there is no need for providing the running condition judging section. That is, it is required to fulfill the function corresponding to the installed position of the steering section 200. In this way, the number of parts as well as the cost can be reduced.

This invention constituted as described above has the following effects.

The invention provides a steering system for mobile unit comprising a steering section for steering a mobile unit by a rotation operation in a first rotation direction, the steering section having operation section for operating a device provided on the mobile unit in one part, and provided to be rotatable in each of different first and second rotation directions, and control section for enabling the mobile unit to be steered when the steering section is rotated in one direction or the second rotation direction and set at a first installed position, and enabling the operation section to operate the device when the steering section is rotated in the other rotation direction and set at a second installed position, whereby the user can use the device without making the settings every time of using the device provided on the mobile unit, and is more expedient.

Also, this invention provides the steering system for mobile unit comprising an installed position detecting section for detecting whether the steering system is set at the first installed position or the second installed position, and the control section enables the mobile unit to be steered or the operation section to operate the device, depending on a detection of the installed position detecting section, whereby the user can make the operation of the device correctly and the reliability of the device is enhanced.

The invention provides the steering system for mobile unit, wherein the operation section is formed integrally with the steering section, and disposed on the back face of the steering section when the steering section is set at the first installed position or disposed on the front surface of the steering section when the steering section is set at the second installed position, whereby there is no need for a new space for installing the operation section within the mobile unit, and the degree of freedom for designing is increased.

The invention provides the steering system for mobile unit comprising a display section placed near a driver's seat of the mobile unit, and a display control section for displaying the mobile information output from the mobile unit on the display section when the steering section is set at the first installed position, or displaying the output information of the device operated by the operation section provided on the steering section on the display section when the steering section is set at the second installed position, whereby the display unit can be shared without regard to the display contents, and the number of parts and the cost can be reduced.

The invention provides the steering system for mobile unit, wherein the mobile information displayed on the display section when the steering section is set at the first installed position is the operative condition information indicating an operative condition of the mobile unit or the running guide information indicating a running guide of the mobile unit, whereby various pieces of information can be displayed on the shared display unit, and the user is more expedient.

The invention provides the steering system for mobile unit comprising a running condition judging section for judging a running condition of the mobile unit, wherein an operation of the operation section is invalidated on the basis of a judgment of the running condition judging section, whereby it can be judged whether the operation is valid or not depending on the running condition of the mobile unit, and the reliability of the device is enhanced.

Further, the invention provides the steering system for mobile unit, comprising a running condition judging section for judging a running condition of the mobile unit, a braking condition detecting section for detecting a braking condition of the mobile unit, and steering position moving section for moving the installed position of the steering section to the first installed position, if the braking condition detecting section detects the braking condition, when the installed position detecting section detects that the steering section is set at the second installed position, whereby when the user steers the mobile unit, the user can save the trouble of changing the installed position of steering section, and is more expedient.

What is claimed is:

1. A steering system for a mobile unit comprising:
   a steering section for steering a mobile unit by a rotation operation in a first rotation direction,
   said steering section including an operation section for operating a device provided on said mobile unit, and provided to be rotatable respectively in said first and a second rotation directions; and
   a control section for enabling said mobile unit to be steered when said steering section has been rotated in one direction of said second rotation direction and set at a first installed position, and enabling said operation section to operate said device when said steering section has been rotated in the other rotation direction of said second rotation direction and set at a second installed position.

2. The steering system for a mobile unit according to claim 1, further comprising;
   an installed position detecting section for detecting whether said steering system is set at the first installed position or the second installed position, wherein
   said control section enables said mobile unit to be steered or said operation section to operate said device, on the basis of a detection by said installed position detecting section.

3. The steering system for a mobile unit according to claim 1, wherein
   said operation section is formed integrally with said steering section, and disposed on the back face of said steering section when said steering section is set at the first installed position, or disposed on the front surface of said steering section when said steering section is set at the second installed position.

4. The steering system for a mobile unit according to claim 1, further comprising;
   a display section placed near a driver's seat of said mobile unit, and
   a display control section for displaying the mobile information output from said mobile unit on said display section when said steering section is set at the first installed position, or displaying the output information of said device operated by said operation section provided on said steering section on said display section when said steering section is set at the second installed position.

5. The steering system for mobile unit according to claim 4, wherein
   the mobile information displayed on said display section when said steering section is set at said first installed position is the operative condition information indicating an operative condition of said mobile unit or running guide information indicating a running guide of said mobile unit.

6. The steering system for a mobile unit according to claim 1, further comprising;
   a running condition judging section for judging a running condition of said mobile unit, wherein
   an operation of said operation section is invalidated on the basis of a judgment of said running condition judging section wherein said mobile unit is determined to be moving.

7. The steering system for a mobile unit according to claim 1, further comprising;
   a running condition judging section for judging a running condition of said mobile unit,
   a braking condition detecting section for detecting a braking condition of said mobile unit, and
   a steering position moving section for moving the position of said steering section to the first installed position, if said braking condition detecting section detects the braking condition, when said installed position detecting section detects that said steering section is set at the second installed position.

* * * * *